INVENTOR.
BEN DAVIES

INVENTOR.
BEN DAVIES

United States Patent Office 3,199,994
Patented Aug. 10, 1965

3,199,994
REFRACTORY STRUCTURE AND SHAPES THEREFOR
Ben Davies, Pittsburgh, Pa., assignor to Harbison-Walker Refractories Company, Pittsburgh, Pa., a corporation of Pennsylvania
Filed Feb. 18, 1963, Ser. No. 259,461
8 Claims. (Cl. 106—55)

This invention relates to refractory structures and to improved refractory shapes usable in the fabrication thereof. Another aspect of this invention relates to improved basic refractory structures, refractory shapes for fabrication thereof, and methods of fabrication of such shapes.

Refractories made from a mixture of dead burned magnesia and chrome ore hold an important place in industry. These refractories are generally divided into those which have a predominance of chrome ore and those which have a predominance of magnesia. This invention is particularly concerned with those having a predominance of magnesia, and to refractory structures which they are used to fabricate.

Both of the foregoing types of refractories are referred to in the art as basic refractories. There are various commercial versions of these refractories, which are normally sold as either chemically bonded unburned refractories, or as burned refractories. This invention relates particularly to the latter, but has utility in manufacture of the former.

Despite the technical advance of contemporary workers, burned basic refractory shapes or brick of the magnesia-chrome ore type are characterized by relatively low strength, somewhere within the temperature range of use. It is not uncommon for their modulus of rupture to be less than 600 p.s.i. at room temperature, less than 200 p.s.i. at 2300° F., and even weaker at higher temperatures. In other cases the brick may be quite strong at room temperature (1000 to 1500 p.s.i.), but no stronger at high temperatures than the figures just cited.

In a furnace wall or roof, a brick may be subjected to many different stresses, both internal and external. These stresses may arise from the thermal gradient in the brick, shifting of furnace loads, differential thermal expansion of different mineral components, alternate freezing and melting of eutectics within the brick, etc. These stresses can cause large sections of a furnace roof or wall to peel away. This peeling may be referred to as spalling loss. Such spalling loss, due to the progressive weakening of refractory shapes, becomes aggravated with continued furnace operation.

Prior workers have approached the problem of obtaining acceptable strength and resistance to spalling for magnesia-chrome ore refractories, by attempting to build a refractory shape which is strong at room temperature, i.e., which has a good modulus of rupture at room temperature. The approach of such prior workers is based primarily on the thought that brick gradually lose their strength as the temperature is raised and, for any particular system, the brick with the highest strength at room temperature will most likely have the highest strength at elevated temperatures. While this is occasionally true, increasing the strength at room temperature is normally attained by sacrificing resistance to spalling.

In the co-pending application, Serial Number 212,992, filed July 27, 1962, now U.S. Patent No. 3,180,744, and entitled "Refractory," there is disclosed a refractory shape or brick which was built with emphasis on its high temperature strength rather than its strength at room temperature. These shapes have unusual strength at elevated temperatures, and very good spalling resistance. These shapes are preferably fabricated of a particular combination of dead burned magnesia or magnesite and low silica chrome ore. One of the important requirements for the fabrication of these shapes is a firing temperature above 3000° F. and, preferably, above 3050° F. This burning temperature is very important. I have found that as little as a 100° F. lower burning temperature sharply reduced the strength of the brick at 2300° F. The modulus of rupture at 2300° F. is considered an excellent measure of the intermediate temperature strength of basic refractories.

As can be appreciated by skilled workers in the art, a burning temperature above 3000° F., and preferably above 3050° F., is a difficult temperature to attain in many present refractory fabricating plants. With the foregoing in mind, I have now discovered a manner of manufacturing burned basic magnesia-chrome ore refractories having excellent intermediate and high temperature strength, high density and low porosity, as well as other desirable physical properties, with lower burning temperatures.

Accordingly, it is an object of this invention to provide improved methods of manufacturing basic refractory shapes. It is another object of the invention to provide improved burned basic refractory shapes. It is another object of this invention to provide improved basic refractory batches, for fabrication of burned refractories having excellent intermediate and high temperature strength, high density and low porosity. In these objects, considering a 70% magnesite—30% Philippine chrome ore concentrate mixture as an example, by "improved strength" and "excellent strength," I mean a strength above about 1000 p.s.i. at 2300° F. By "high density" I mean a burned density of at least about 190 p.c.f. By "low porosity" I mean an apparent porosity of less than about 17%. These numerical values all refer to a shape burned at about 2950° F.

Briefly, according to one aspect of this invention, there is taught a method of utilizing low silica chrome ores and high purity dead burned magnesite, in a weight ratio of about 70 to 30 to obtain refractory shapes having excellent strength at 2300° F. The chrome ore is sized so that at least a major portion thereof (over 50%) passes a 28 mesh screen and, preferably, rests on a 65 mesh screen. The magnesite is so size graded that between 40 and 50% thereof passes a 28 mesh screen. Of that portion of the magnesia passing the 28 mesh screen, at least 55% and, preferably, at least 85% passes a 325 mesh screen. Such a batch is mixed with no more than about 0.2 to 0.4 pound of tempering fluid per 100 cubic inches of pressed brick, and is formed on a vibratory compacting brick press, commonly referred to as an impact press. The shapes made on this press are burned at from 2900 to 2950° F.

A better understanding, other features and further objects and advantages of this invention will become readily apparent to those skilled in the art by reading the following detailed description, with reference to the drawings. In these drawings.

Figure 1:
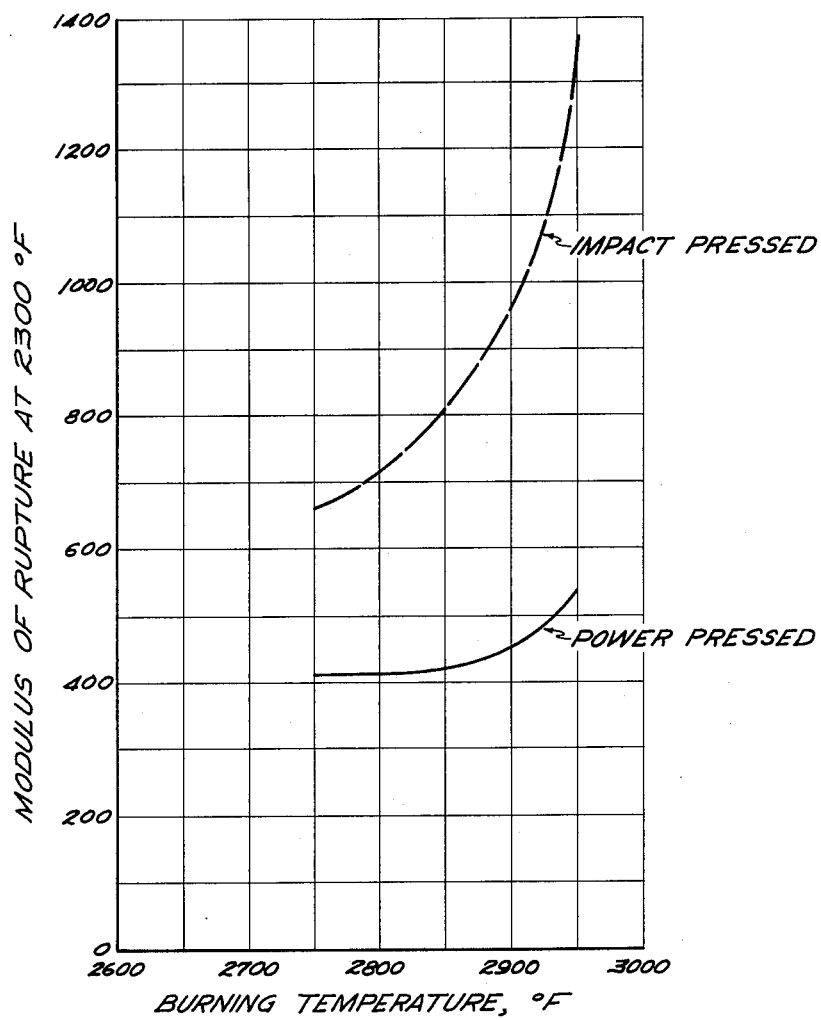
FIG. 1 is a comparative plot of modulus of rupture at 2300° F. vs. burning temperature, for burned shapes according to this invention and shapes of identical chemical and mineralogical content manufactured by prior practices.

While I do not fully understand the phenomenon by which the refractory shapes of my invention exhibit their excellent properties, certain observation can be made. When studied under the microscope at room temperature, they exhibit a peculiar combination of (1) particle to particle attachment between the normally mineralogically dissimilar magnesite and chrome ore particles, and (2) tessellated cracking across the interface (generally perpendicular to) between attached magnesite particles and chrome ore particles. In some manner, this tessellated cracking appears to overcome and compensate for internal stresses which occur in the shapes at operating temperatures, while the direct attachment between the chrome ore and magnesite forms a relatively rigid skeletal network, providing the desired strength under intermediate and high temperature operating conditions.

I had previously noted that I consider the optimum blend, by weight, for magnesia or dead burned magnesite and chrome ore in shapes of the type manufactured according to this invention to be about 70 parts magnesite to 30 parts chrome ore. I do not claim that this particular blend is new to my invention. However, it is this blend in combination with other parameters which produces the best refractories according to this invention. It is also advisable that the silica content of the blend of magnesite and chrome ore be kept low and, preferably, be kept less than 2% $SiO_2$, on the basis of an oxide analysis, for best results.

The following tables and specific examples are illustrative of the best mode presently known to me for the practice of my invention. It should be understood, in the discussion of my invention, that all parts and percentages are by weight. All chemical analyses are according to an oxide analysis, in conformity with the conventional practices of reporting the chemical analyses of refractory materials. Further, all analyses should be considered but typical. All mesh sizes are according to the Tyler series, unless otherwise specifically mentioned.

Table I sets forth typical analyses of exemplary chrome ore and magnesia or magnesite materials usable according to this invention, and which were used in the experimental work described in the examples hereafter:

TABLE I

| Chemical Analyses | Transvaal Chrome Ore, Percent | Philippine Chrome Ore Concentrates, Percent | Dead Burned Magnesia, Percent |
| --- | --- | --- | --- |
| $SiO_2$ | 1.9 | 2.3 | .7 |
| $Al_2O_3$ | 15.6 | 30.0 | 0.5 |
| $Fe_2O_3$ | | | |
| FeO | 24.3 | 12.6 | |
| $Cr_2O_3$ | 46.0 | 33.0 | |
| CaO | 0.2 | 0.6 | 0.8 |
| MgO | 11.3 | 19.0 | 98.0 |
| Ignition Loss (by difference) | 0.7 | 2.5 | |

For Example I below, a batch was prepared of about 30 parts Philippine chrome ore concentrate and about 70 parts dead burned magnesia. Table II sets forth the screen analysis of the Philippine chrome ore concentrates and the magnesia used to make the batch. The percentage figures given are based on the total batch.

TABLE II

*Philippine chrome ore concentrates*

Percent
Passing a 10 mesh screen and resting on a 28 mesh screen _____ 6
Passing a 28 mesh screen and resting on a 65 mesh screen _____ 24
                                                        —
    Total _____ 30

*Dead burned magnesia*

Percent
Passing a 4 mesh screen and resting on a 10 mesh screen _____ 30
Passing a 10 mesh screen and resting on a 28 mesh screen _____ 10
Ball Mill Fines (Nominally, 100% passing 65 mesh and 85% passing a 325 mesh screen) _____ 30
                                                        —
    Total _____ 70

EXAMPLE I

The dry mixture, having the composition and size grading just mentioned, was divided into two batches. Each batch was tempered with a mixture of water and lignin liquor. This is a conventional tempering mixture. The first batch, which was destined for conventional power pressing manufacturing techniques, had about 5 parts, by weight, of the tempering fluid added thereto (2.5% water and 2.5% lignin liquor). The second, which was destined for impact pressing manufacturing techniques, had about 3.6% tempering fluid added (1.8% water and 1.8% lignin liquor). The higher tempering fluid addition to the first batch was dictated by good power press brickmaking techniques.

The first batch was manufactured into shapes on a conventional power press at about 8000 p.s.i. The second batch was manufactured into shapes by impact pressing on an impact press for about 10 seconds. The shapes, from both the power press and impact press manufacture, were then burned and subjected to various physical tests. Table III sets forth the results of this work.

TABLE III

| Mix No. | Power Pressed, 8,000 p.s.i. | Impact Pressed, 10 Seconds | | |
| --- | --- | --- | --- | --- |
| | 1 | 2A | 2B | 2C |
| Burn, Temp. (10 hr. hold), °F | 2,850 | 2,750 | 2,850 | 2,950 |
| Bulk Density, p.c.f. (Av. 10) | 188 | 197 | 195 | 198 |
| Modulus of Rupture, p.s.i. (Ave. 3): | | | | |
| At room temperature (about 72° F.) | 470 | 640 | 670 | 670 |
| At 2,300° F. (5 hr. hold) | 470 | 660 | 810 | 1,370 |
| Apparent Porosity (Av. 3), percent | 17.7 | 13.7 | 15.6 | 14.4 |

Since I felt the very large quantity of −325 mesh magnesia (85% of the −65 mesh BMF fraction) might have been detrimental to the power pressed shapes, I made up another batch similar to the one discussed under Example I, but in which only 50% of the ball mill fine magnesia passed a 325 mesh screen. I used the same tempering fluid addition. I made brick from this batch by power pressing at 8000 p.s.i., and then subjected the shapes to the identical burning and testing procedures as the impact pressed shapes of Table III. This work is reported in Table IV and plotted in FIG. 1.

TABLE IV

| Mix No. | Mixes With Coarser Fines | | |
| --- | --- | --- | --- |
| | 3A | 3B | 3C |
| Burn, Temp. (10 hr. hold), °F | 2,750 | 2,850 | 2,950 |
| Bulk Density, p.c.f. (Av. 10) | 186 | 184 | 184 |
| Modulus of Rupture, p.s.i. (Av. 3): | | | |
| At room temperature (about 72° F.) | 290 | 310 | 260 |
| At 2,300° F. (5 hr. hold) | 410 | 410 | 540 |
| Apparent Porosity (Av. 3), percent | 18.5 | 19.5 | 19.2 |

The results of Example I indicated an intermediate temperature strength (at 2300° F.) of over 1000 p.s.i.

could be obtained in brick burned at temperatures of only 2950° F. if impact press manufacturing was utilized, the percentage liquid bond was carefully controlled, and the size grading—particularly of the magnesite—was also carefully controlled. FIG. 1 dramatically illustrates the effect sizing and impact pressing has on strength at 2300° F., as compared to power pressing.

I felt perhaps an increase in pressure on the power press and a higher burning temperature could achieve results comparable to the relatively low temperature burn and low pressure forming techniques incident to the impact press manufacture. I therefore, prepared another batch substantially identical to that discussed under Example I, above, except I used Transvaal chrome ore, and formed it into shapes by power pressing at 12,000 p.s.i., and burned the resulting shapes at 2950° F. I also took a portion of this batch, subjected it to the impact pressing forming techniques of Example I to obtain a good comparison, and burned the resulting shapes at the same 2950° F. temperature. Table V shows the result of this work.

TABLE V

| Mix No. | Impact Press 4 | Power Press 5 |
|---|---|---|
| Bulk Density, p.c.f. (Av. 10) | 203 | 191 |
| Modulus of Rupture, p.s.i. (Av. 5): | | |
| At room temperature (about 72° F.) | 660 | 270 |
| At 2,300° F. (5 hr. hold) | 1,700+ | No test. |
| Apparent Porosity (Av. 5), percent | 14.3 | 19.2 |

If anything, it appeared very high pressure power pressing lessened the strength of the resulting shapes. The power pressed shapes were punkey and so weak they were not suitable for testing at 2300° F. The impact pressed shapes could not be broken on my testing apparatus at 2300° F. The 1700+ p.s.i. figure of Table V is but exemplary of the especially high strength obtained, this being the limit of my testing apparatus.

Tables III and V also dramatically illustrate the remarkably low porosity, i.e. less than 15%, that can be obtained in shapes manufactured according to this invention. These tables also show consistent higher density.

I repeated the procedures of Example I (as reported in Table III) using Transvaal chrome ore having the chemical analysis as set forth in Table I, above, to assure that comparable results could be obtained with a different chrome ore. The additional tests established this fact.

In the exemplary batches discussed above, about 85% of the ball mill fine magnesia passed a 325 mesh screen. Good results are obtained when between about 50 and 95% is —325 mesh. For example, a batch having the same chemical makeup and size grading as that discussed under Example I, above, was prepared, except only 50% of the ball mill fines magnesia passed a 325 mesh screen. A 2950° F. burn produced a density in shapes made from this batch of over 190 p.c.f. and a strength at 2300° F. of over 1000 p.s.i.

Prior to my invention, very dense basic brick have been difficult to manufacture, because basic grains are inherently nonplastic and, under brick forming pressures as are encountered on a power press, these grains tend to bridge rather than flow to fill the internal voids in a brick. My preferred size grading and particularly careful control of the magnesia size grading in some manner increases apparent plasticity in forming the brick, and tends to prevent grain bridging.

The power press, which I used in conducting the tests reported above, had the conventional hydraulic press action, in which a pair of opposed pads under the influence of hydraulic pressure work or compress a batch material in an enclosing cavity. The impact press was also of a conventional type manufactured by the Harbison-Walker Refractories Company of Pittsburgh, Pennsylvania, in which a pair of opposed pads work an enclosed batch of material. This working is accomplished in the following manner: Each pad is attached to one or two pneumatic hammers. Upon actuation, these hammers cause vibration (in the neighborhood of about 100 to 200 cycles per second) of the opposed pads. This vibration forms the self-sustaining shape or brick which results. There is very little pressure, per se, exerted by the pads, i.e. less than about 100 p.s.i., most of this being the result of the actual weight of the upper pad, pneumatic hammers and suport structure.

According to my preferred manufacturing techniques, vibration is maintained for about 10 seconds. I have successfully fabricated shapes with vibration for only 2 seconds, and for as long as 30 seconds. The time which a shape is impacted will vary from machine to machine, depending on the size of the shape, air pressure and frequency at which the pads are vibrated, and also the characteristics of the batch materials which form the shape. Thus, in the discussion and claims, "impact press" and "impact pressing" is meant to broadly describe a class or type of forming, and to distinguish it from hydraulic and like power pressing procedures.

While in my discussions above I have considered a 70/30 weight combination of magnesia and chrome ore as best, a very satisfactory range is between about 80/20 and 60/40. In some European practices, chrome ore and magnesia batch mixtures are on the order of about 10 parts chrome and 90 parts magnesia (I know specifically of one instance in which 12.5 parts chrome ore and 87.5 parts magnesia are used). It should be understood that the broad aspects of my invention are applicable to such batch mixtures. For example, by following my teachings relative to control of the fine fraction of a batch, use of impact pressing techniques, and control of tempering fluid, increased density, decreased porosity, and better strength at 2400° F. will be obtained. By "increased" density, "decreased" porosity and "better" strength, I mean appreciable and not negligible improvement over prior power press manufacture.

It has also been found that my invention has utility in the manufacture of unburned shapes. Off the press, for example, a density increase of about 10 p.c.f. is obtained when using the methods of this invention. These green shapes are strong and well filled out. They have clean edges, with little crumbling thereof occurring during handling.

Figure 2:
FIG. 2 is a photomicrograph exemplary of burned basic brick fabricated according to the techniques of this invention.
Figure 3:
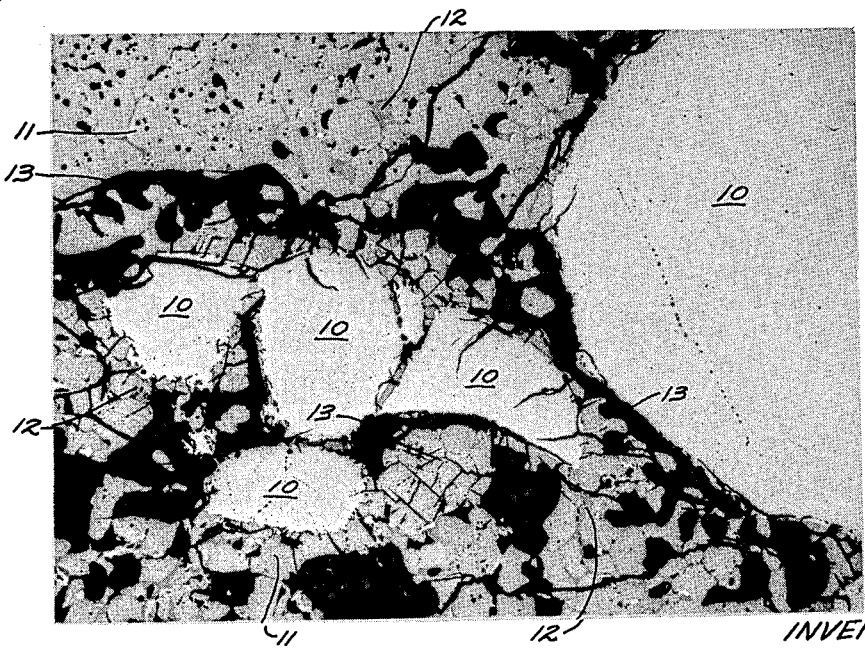
FIG. 3 is a photomicrograph exemplary of a brick of chemical and mineralogical content similar to the brick of FIG. 2, but which has been fabricated by prior techniques.

FIGS. 2 and 3 will give some idea of the remarkable direct particle to particle attachment, which characterizes refractories according to my invention. FIG. 2 is a photomicrograph of a specimen taken from a shape of the type reported in Table III, above, impact pressed, but with a 3050° F. burn, 92% of the ball mill fine magnesia passing a 325 mesh screen. FIG. 3 is the same, except formed by power pressing at 8000 p.s.i. The light gray to white grains 10 in each photo (both FIGS. 2 and 3) are chrome ore. The rounded intermediate gray grains or crystals 11 are periclase, and the darker gray interstitial material 12 is forsterite. The black areas 13 are voids.

Note the very small, widely dispersed, and generally discontinuous, character of the voids in FIG. 2, as compared to FIG. 3. Note, also in FIG. 3, the tendency of the voids to concentrate along the boundaries between the chrome ore and magnesia, thereby weakening the structure. FIG. 2 also shows the tessellated cracking as at 15, substantially perpendicular to chrome ore-magnesia interfaces, which further characterizes shapes according to this invention.

In one commercial test, a batch was made up consisting of about 30% Philippine chrome ore concentrates and about 70% dead burned magnesia. 3.6% of a 50/50 water-lignin liquor tempering fluid was added. Shapes were made from the batch by impact pressing for 10 seconds, and burning at 2950° F. with a 10-hour hold. The percentage of magnesia ball mill fines, which passed a 325 mesh screen, was varied. In Table VI below, Mix 6 had ball mill fines of which 55% pass a 325 mesh screen; those in Mix 7 had 67% pass a 325 mesh screen; and those in Mix 8 had 77% pass a —325 mesh screen.

TABLE VI

| Mix No. | 6 | 7 | 8 |
|---|---|---|---|
| Mix, percent: | | | |
| Philippine chrome ore concentrates: | | | |
| —6+28 mesh | 6 | 6 | 6 |
| —28 mesh | 24 | 24 | 24 |
| Magnesia: | | | |
| —4+10 mesh | 30 | 30 | 30 |
| —10+28 mesh | 10 | 10 | 10 |
| Ball Mill Fines | 30 | 30 | 30 |
| Average Particle Size of Ball Milled Fines, microns [1] | 5.9 | 4.7 | 3.3 |
| Burn, Temperature, ° F. (10 hr. hold) | 2,950 | 2,950 | 2,950 |
| Bulk Density, p.c.f.: | | | |
| Unburned | 197 | 199 | 201 |
| Burned | 190 | 193 | 195 |
| Modulus of Rupture, p.s.i.: | | | |
| At Room Temperature (about 72° F.) | 610 | 670 | 600 |
| At 2,300° F. (5 hr. hold) | 1,010 | 1,110 | 1,040 |
| Apparent Porosity (Av. 5), percent | 17.3 | 16.7 | 15.2 |

[1] Determined in the same manner as Table VII micron sizing.

These tests substantiated the commercial applicability of my invention. Each of Mixes 6, 7 and 8 showed a modulus of rupture at 2300° F. above 1000. As will be noted from Table VI, another way to describe the character of the ball mill fines of this invention is in terms of average particle size in microns.

The content of tempering fluids and their nature is of importance. First of all, I have been unsuccessful with other than aqueous fluids, and have come to consider that only tempering fluids which are water-based can be considered applicable. Also important is the amount of tempering fluid. In one series of tests I prepared identical batches and added differing amounts of tempering fluid as follows:

(1) 1.8% lignin liquor + 1.2% water
(2) 1.8% lignin liquor + 1.4% water
(3) 1.8% lignin liquor + 1.8% water
(4) 1.8% lignin liquor + 2.0% water Since the lignin liquor contains 50% water, the gross amounts of water in these four mixes were 2.1, 2.3 2.7 and 2.9%, respectively. When formed into burned brick by my process, the latter showed bulk densities of 197, 198, 200 and 200 in the same order. While these are all satisfactory bulk densities, difficulties were encountered with the end members of the series. Thus, brick of Mix 1 (2.1% gross water) were difficult to eject from the mold box, and Mix 4 (2.9% gross water) was somewhat rubbery and, therefore, not as satisfactory as usually desired.

I find there is a definite amount of tempering liquid which is satisfactory, and that it is best expressed as about 0.25 to 0.35 pound of water per 100 cubic inches unfired or dried brick. If this seems to be obtusely stated, it should be noted that 100 cubic inches is the approximate size of the standard "nine inch straight" brick of the refractories industry.

Among the aqueous tempering fluids which can be used are solutions or suspensions of many of the agents commonly known to those skilled in the refractory arts, so long as they provide the required lubrication for the batch particles. I have been successful with water+dextrine, water+chromic acid, water+epsom salts, and others. I am sure that skilled persons could satisfactorily adapt to use in this way a wide variety of agents adaptable to preparation as solution or suspension, including carboxymethylcellulose, alginates, starches and gums. It will be noted that certain of these tempering materials are commercially available not only in liquid form (e.g. lignin liquor) but also as solids. While I prefer to use the prepared liquids for convenience, it is possible to use the solids. Thus, in the case of Mix 4, above, where I used 2% water and 1.8% lignin liquor (50% water + 50% solids) for a gross water addition of 2.9%, had I instead added the lignin in the form of powder, I would have adjusted the amount of the water to have used an actual water addition of 2.9% instead of 2.0%.

Similarly, in other instances, when using such agents as chromic acid or epsom salts, I might prefer to add them as powders so that water could be the sole tempering fluid, added as such.

These practices will appear less complex, when it is noted that I control the amount of water (whether added as such, or as aqueous solutions or suspensions) at 0.25 to 0.35 pound per 100 cubic inches of brick.

At this status of my study, I had satisfied myself as to the optimum blend for the magnesia and chrome ore, the most satisfactory quantity of tempering fluid for the batch, and that modulus of rupture of over 1000 p.s.i. at 2300° F. could be obtained with a burn as low as 2900° F.—but preferably 2950° F. My studies at this point also established the completely unexpected characteristics imparted to brick according to this invention, when they were formed on an impact press as compared to a power press. I, therefore, determined to more precisely define the acceptable range for grading the —325 mesh fraction of the magnesite. Example II below covers this aspect:

EXAMPLE II

A batch was fabricated of 30 parts Philippine chrome ore concentrates and 70 parts dead burned magnesia. The chrome ore and magnesia had a size grading substantially as set forth in Table I. However, the ball mill fine fraction of the magnesia was varied. The size grading of the 325 mesh fraction of the ball mill fine magnesia was determined by wet screening. The average particle size by (number) was determined on a Fisher Porter Subsieve Analyzer. Shapes were made on an impact press using the same manufacturing techniques as set forth with reference to Example I, except a 2900° F. burn was used.

TABLE VII

| Mix No. | 9 | 10 | 11 | 12 | 13 | 14 | 15 |
|---|---|---|---|---|---|---|---|
| Percent by weight —325 mesh in Ball Mill Fines | 30 | 45 | 55 | 60 | 70 | 80 | 90 |
| Average Particle Size, in microns, of Ball Mill Fines (by number) | 11.7 | 8.2 | 6.4 | 5.7 | 4.4 | 3.5 | 2.9 |
| Burn | 2,900° F., 10 hour hold | | | | | | |
| Bulk Density, p.c.f. (Av. 10) | 188 | 192 | 193 | 194 | 197 | 198 | 199 |
| Modulus of Rupture, p.s.i. (Av. 3): | | | | | | | |
| At room temperature (about 72° F.) | 310 | 490 | 620 | 630 | 700 | 670 | 640 |
| At 2,300° F. (5 hr. hold) | 710 | 1,050 | 990 | 1,070 | 1,030 | 1,160 | 1,300 |
| Total —325 mesh in Batch | 9 | 13.5 | 16.5 | 18 | 21 | 24 | 27 |

The 11.7 microns average particle diameter rather drastically reduced the modulus of rupture at 2300 by about 350 p.s.i.

These tests indicated the average particle diameter of the Ball Mill Fine magnesia must be less than about 9 microns. As a practical matter, however, subdivision below about 3½ microns does not appear justified from an economic standpoint, since the relative increase in strength at 2300° F. could be more easily obtained simply by burning the shapes at a slightly higher temperature. I believe the best range to be between 3.3 and 4.7 microns.

The tempering fluid used for the mixes of Table VII was a mixture of about 1.8 parts lignin liquor and about 1.8 parts water; these weights being based on the total weight of the dry solids in the batch.

In the foregoing discussion, I have generally set forth the best methods now known to me for the practice of my invention. However, variation may be had therefrom, and satisfactory and good results may still be obtained. For example, considering the sizing of the magnesia, which is set forth in Table II above, about 50% thereof is ball mill fines, i.e. nominally 100% passing a 65 mesh screen. Satisfactory results are obtained when between 25 and 50% of the magnesia, in a size graded batch of chrome ore and magnesia, passes a 28 mesh screen. Good results are obtained when between 25 and 40% of the magnesia, in a size graded batch of chrome ore and magnesia, passes a 65 mesh screen. Optimum results are obtained when between 25 and 35% of the magnesia, in a size graded batch of chrome ore and magnesia, passes a 65 mesh screen—with best results when this quantity of magnesia passes a 100 mesh screen. In all situations, however, the total size graded batch must have between about 13 and 30% −325 mesh particles (see Table VII regarding the lower limit). At 35% −325 mesh particles, the brick explode when ejected from the press, due to entrapped air. At 30%, satisfactory brick are possible, but a few pressure cracks appear in some instances.

The chrome ore and magnesia batch mixture preferably consists of 30% chrome ore and 70% magnesia. Good results were obtained in mixtures ranging between 20% chrome ore—80% magnesia and 40% chrome ore—60% magnesia.

In the foregoing discussions, and in the claims which follow, we state that the batch consists essentially of chrome ore and magnesia. It should be understood that minor amounts, i.e. up to 10%, of various auxiliary agents commonly used in the refractories art could be included in the batch, and the beneficial results of my invention are still obtained.

Also, while best results were obtained when the $SiO_2$ content, by weight and on the basis of an oxide analysis, of the batch ingredients was less than 2%; good results were obtained when this $SiO_2$ content was as high as 5%. While such silica contents are suggested for better results, satisfactory results are obtained when using natural magnesites of as high as 6% $SiO_2$ content, by weight and on the basis of an oxide analysis, and crude chrome ore with a silica content approaching 6%, by weight and on the basis of an oxide analysis.

As noted above, various auxiliary agents may be added. For example, boric acid, alumina, small amounts of free lime, etc. Up to 2% of very finely divided (−325 mesh) titania ($TiO_2$) is unexpectedly beneficial. In actual testing, I found that by using small quantities of technical grade titania I could lower the firing temperature for my magnesia-chrome ore shapes on the order of 100 to 150° F. For example, by adding about 2%, by weight, of technical grade titania to a preferred 70% magnesia—30% chrome ore batch in place of a similar quantity of similarly size graded magnesia, I was successful in obtaining modulus of ruptures at 2300 of over 1000 p.s.i., porosities of less than 17%, and bulk densities of well over 190 p.c.f., at much lower firing temperatures. In fact, firing at 2850° F., I was able to obtain a bulk density of over 200 p.c.f. The batch to which the titania was added, of course, met all of the requirements as to size grading, as discussed above; and the sample shapes were formed on an impact press, as discussed above. One batch, for example, was the same as that discussed in Table II above substituting about 2%, by weight, of titania for similar quantities of similarly size graded magnesia.

The remarkable results, which I was able to obtain in magnesia-chrome ore systems when using the methods of my invention, led me to study other basic refractory systems. They included, for example, high purity magnesia, somewhat less pure magnesia, chrome ore with magnesia, and zircon bonded magnesia. I used an overall size grading the same as that of Table II above, without special regard to which screen fractions the individual ingredients were in. Brick made from these batches averaged over a 10 p.c.f. increase in bulk density and over 5% decrease in porosity, as compared to prior power pressed shapes of similar composition. The following examples are indicative of this additional testing:

EXAMPLE III

Two batches were prepared of 98% pure dead burned magnesia, having a chemical analysis as set forth in Table I, above. The first batch had the same size grading as the batch of Table II. The second batch had the following size grading: about 30% 4 on 10 mesh, about 30% −10 +65 mesh, the remainder passing a 65 mesh screen. Of that portion passing the 65 mesh screen, about 40% passed a 150 mesh screen (regular ball mill fines). Normal power pressing tempering procedures were used with this more coarsely size graded batch, whereas the other had a lignin liquor-water addition of 0.29 pound water calculated for each 100 cubic inches of resulting impact pressed brick. Brick were made from each batch. With the batch having the size grading of this invention, of course, shapes were made on an impact press, whereas the more coarsely size graded one was used to make shapes on a power press at 8000 p.s.i. All shapes were burned at 2850° F. Shapes made from the batch having the sizing and tempering water addition of this invention had a burned bulk density of 191 p.c.f. The shapes made from the other batch had a bulk density of only 178 p.c.f. These power pressed shapes had a porosity of 17.6%. Those of the power press manufacture had a porosity of whereas those formed on the impact press, according to this invention, had a porosity of only 12.8%.

EXAMPLE IV

I made up two additional batches, each of them was 70 parts of dead burned magnesia of the type used in Example III, and 30 parts of zircon. The chemical analysis of the zircon was typically as follows:

| | Percent |
|---|---|
| Silica ($SiO_2$) | 32.3 |
| Alumina ($Al_2O_3$) | 1.0 |
| Zirconia ($ZrO_2$) | 66.1 |
| Titania ($TiO_2$) | 0.2 |
| Iron Oxide ($Fe_2O_3$) | 0.2 |
| Alkalies | 0.2 |
| Ignition Loss | --- |

The first batch was made using the size grading and manufacturing techniques of this invention, while the other batch had the same size grading as the comparative batch of Example III and was made into shapes on the power press at 8000 p.s.i. Shapes made from both of these batches were burned to 2850° F. The shapes, according to this invention, had an average bulk density of 204 p.c.f., while those from the power press manufacture had a bulk density of only 194 p.c.f. The porosity of the shapes made according to this invention was about 9.3%. 14.4%. In a panel spalling test with a preheat at 3000°

F., the power pressed shapes had an 11.8% loss. The comparative shapes made according to this invention had no loss in an identical test.

EXAMPLE V

Two additional batches were prepared from a less pure dead burned magnesite. The oxide analysis of this magnesite was as follows:

| | Percent |
|---|---|
| Silica ($SiO_2$) | 2.8 |
| Alumina ($Al_2O_3$) | 0.3 |
| Iron oxide ($Fe_2O_3$) | 0.6 |
| Lime (CaO) | 1.5 |
| Magnesia (MgO) | 94.8 |

The two batches were made using the same sizing techniques, and were manufactured into shapes according to the same methods as the two magnesia batches and resulting shapes of Example III. The shape made according to the techniques of this invention had an average bulk density of 188 p.c.f. Those made according to prior sizing and power pressing techniques had a bulk density of only 175 p.c.f. The porosity of these power pressed shapes was 21.5%, whereas those made according to the present invention had a porosity of only 13.1%.

EXAMPLE VI

Still two more batches were prepared. These batches consisted of 20 parts, by weight, of the magnesite of Example V and 80 parts, by weight, of the Philippine chrome ore. In the first batch, the magnesite was all in the −100 mesh fraction. The chrome ore constituted all of the −3 +8 mesh fraction (20% of the total batch), all of the −8 +28 mesh fraction (43% of the total batch), with the remainder in the −100 mesh fraction. Thus, 34% of the total batch was −100 mesh. The total batch met the sizing requirements of the invention and was substantially the same as the total sizing of the components of Table II, above.

The second batch had a sizing the same as the comparative batches of Examples III, IV and V, with the magnesite all falling in the −65 mesh fraction of the batch. These two batches were subjected to manufacturing techniques the same as described in Examples III, IV and V. The shapes made according to the techniques of this invention had a bulk density of 202 p.c.f., and the shapes made using power pressing had a bulk density of 189 p.c.f. These conventionally manufactured shapes had a porosity of 21.1%, while the shapes of this invention had a porosity of only 17.2%.

From the foregoing examples, it will be seen that my invention is applicable to a variety of refractory compositions. However, I have found that it can not be applied to many other compositions used in the manufacture of refractories. For example, fireclay refractories are most commonly produced from mixtures of hard and soft refractory clays, of which the latter are highly plastic and free-flowing. These compositions are not suitable for my process. Faults of various kinds arise, either amounting to a failure to achieve high density or even a product of good shape. The presence of usual amounts of calcined and therefore nonplastic ingredients, for example 25 to 50% of the mix, does not alter the situation, but I believe that if the plastic clay was either eliminated or reduced to very low percentage, less than 5%, my techniques would apply. To the best of my knowledge, all of the compositions which have responded to the techniques of my invention are distinguished from nonresponding compositions by being almost wholly nonplastic. The meaning of this term is well established in the refractories industry. Plastic materials include crude (uncalcined) kaolins, ball clays, fireclays, bauxite (somewhat plastic) and diaspore. Nonplastic ingredients include dead burned magnesite, crude or calcined chrome ores, crude or calcined olivine, zircon, crude or calcined kyanite, dense refractory grade alumina, calcined diaspore or calcined bauxite, dense zirconia, and refractory quartzite. At least two of these materials, if only lightly calcined (caustic magnesite and reactive alumina), will still retain a certain amount of plasticity; although a small percentage (of the order of 1 to 15%) might not entirely negate the advantages of my processes, these materials must at best only be viewed with toleration in my nonplastic systems.

In testing high purity alumina materials, I made shapes from a batch consisting entirely of tabular alumina, sized according to the teaching above. The shapes were made on an impact press. A bulk density of 206 p.c.f. was obtained. The average bulk density for shapes made from identical materials but on a power press is about 195 p.c.f.

As mentioned above, this invention relates primarily to burned brick. The superior physical properties, which characterize the burned brick of this invention, are numerically designated in a general way in the above discussion. As also noted above, this invention has utility in manufacturing unburned basic refractories. The outstanding physical characteristic of such unburned refractories is their exceptionally high density, as compared to previously available similar refractories.

Having thus described the invention in detail and with sufficient particularity as to enable those skilled in the art to practice it, what is desired to have protected by Letters Patent is set forth in the following claims.

I claim:

1. A fired basic refractory shape made from a tempered, size graded refractory brickmaking batch, the solids in said batch consisting essentially of dead burned magnesia and chrome ore, the chrome ore to magnesia weight ratio being between 40:60 and 20:80, from 25 to 50%, by weight, of the magnesia passing a 28 mesh screen, from 50 to 95%, by weight, of the magnesia which passes a 28 mesh screen also passing a 325 mesh screen, from 13 to 30%, by weight, of the total batch of chrome ore and magnesia passing a 325 mesh screen, the average particle diameter of that fraction of the total batch which passes a 65 mesh screen, by number, being less than 9 microns, substantially all the remainder of the batch being −4 +28 mesh, there being no more than about 2%, by weight, $SiO_2$ in the total batch, said fired shape mineralogically characterized by direct chrome spinel to magnesia particle attachment substantially without intervening silicate filming.

2. A shape according to claim 1 having a density of over 190 p.c.f., a modulus of rupture at 2300° F. which is in excess of 1000 p.s.i. and a porosity which does not exceed about 17%.

3. That method of fabricating fired refractory shapes from size graded batches consisting essentially of dead burned magnesia and chrome ore which comprises the steps of, fabricating a size graded refractory brickmaking batch in which the chrome ore to magnesia weight ratio is between 40:60 and 20:80, from 25 to 50%, by weight, of the magnesia passing a 28 mesh screen, from 50 to 95%, by weight, of the magnesia which passes a 28 mesh screen also passing a 325 mesh screen, total amount of the batch passing a 325 mesh screen amounting to between 13 and 30%, by weight, that portion of the total batch passing a 65 mesh screen having an average particle diameter, by number, of less than 9 microns, substantially all the remainder of the batch being −4 +28 mesh, mixing said batch with an aqueous tempering agent having a water content in the weight ratio of about 2/10 to 4/10 pound of water for each 100 cubic inches of impact pressed brick made from the batch, subjecting said batch to impact pressing to form self-sustaining bodies, firing said bodies at a temperature above about 2900° F. for a time period sufficient to cause direct chrome ore spinel to magnesia particle attachment substantially without intervening silicate filming, recovering fired basic refractory shapes.

4. That method of fabricating refractory shapes from size graded, tempered, nonplastic refractory brickmaking batches which comprises the steps of, fabricating a size graded nonplastic refractory brickmaking batch, from 25 to 50%, by weight, of said batch passing a 28 mesh screen, from 50 to 95%, by weight, of the batch which passes a 28 mesh screen also passing a 325 mesh screen, the average particle diameter of that fraction of the total batch which passes a 65 mesh screen, by number, being less than 9 microns, the total amount of the batch passing a 325 mesh screen amounting to between 13 and 30%, by weight, substantially all the remainder of the batch being on the order of about $-4 +28$ mesh, mixing said batch with an aqueous tempering agent in a weight ratio of about $2/10$ to $4/10$ pound of water per 100 cubic inches of impact pressed brick made from the batch, subjecting said batch to impact pressing to form self-sustaining bodies.

5. That method of fabricating fired refractory shapes from size graded, tempered, nonplastic refractory brickmaking batches which comprises the steps of, fabricating a size graded nonplastic refractory brickmaking batch, from 25 to 50%, by weight, of said batch passing a 28 mesh screen, from 50 to 95% by weight, of the batch which passes a 28 mesh screen also passing a 325 mesh screen, the average particle diameter of that fraction of the total batch which passes a 65 mesh screen, by number, being less than 9 microns, the total amount of the batch passing a 325 mesh screen amounting to between 13 and 30%, by weight, substantially all the remainder of the batch being on the order of about $-4 +28$ mesh, mixing said batch with an aqueous tempering agent in a weight ratio of about $2/10$ to $4/10$ pound of water per 100 cubic inches of impact pressed brick made from the batch, subjecting said batch to impact pressing to form self-sustaining bodies, firing said bodies.

6. The method of claim 4 in which said aqueous tempering agent is selected from the group consisting of water and dextrine, water and chromic acid, water and Epsom salts and water and lignin.

7. The method of claim 4 in which said nonplastic refractory is selected from the group consisting of dead burned magnesia, crude and calcined chrome ore, crude and calcined olivine, zircon, crude and calcined kyanite, dense refractory grain alumina, calcined diaspore, calcined bauxite, dense zirconia, and refractory quartzite.

8. That method of fabricating refractory shapes from size graded, tempered, nonplastic refractory brickmaking batches which comprises the steps of, fabricating a size graded nonplastic refractory brickmaking batch, from 25 to 50%, by weight, of said batch passing a 28 mesh screen, from 50 to 95%, by weight, of the batch which passes a 28 mesh screen also passing a 325 mesh screen, the average particle diameter of that fraction of the total batch which passes a 65 mesh screen, by number, being less than 9 microns, the total amount of the batch passing a 325 mesh screen amounting to between 13 and 30%, by weight, substantially all the remainder of the batch being on the order of about $-4 +28$ mesh, mixing said batch with an aqueous tempering agent in a weight ratio of about $2/10$ pound to $4/10$ pound of water per 100 cubic inches of brick when made on an impact press of said batch, forming shapes from the batch.

References Cited by the Examiner

UNITED STATES PATENTS 2,316,228  4/43  Erdmann _____ 106—59

FOREIGN PATENTS 446,474  1/48  Canada.

TOBIAS E. LEVOW, *Primary Examiner.*

UNITED STATES PATENT OFFICE
CERTIFICATE OF CORRECTION

Patent No. 3,199,994                          August 10, 1965

Ben Davies

It is hereby certified that error appears in the above numbered patent requiring correction and that the said Letters Patent should read as corrected below.

Column 5, TABLE V, second column, line 1 thereof, for "203" read -- 202 --; column 6, line 39, for "2400° F." read -- 2300 ° F. --; column 8, line 55, for "by (number)" read -- (by number) --; same line 55, for "Porter" read -- Particle --; column 10, line 46, strike out "Those of the power press manufacture had a porosity of", and insert the same after "9.3%." in line 74, same column 10; column 12, line 63, after "ticle" strike out the comma.

Signed and sealed this 20th day of December 1966.

(SEAL)
Attest:

ERNEST W. SWIDER                          EDWARD J. BRENNER
Attesting Officer                            Commissioner of Patents